Patented June 12, 1951

2,556,688

UNITED STATES PATENT OFFICE 2,556,688

PHARMACEUTICAL METHIONINE COMPOSITION

Harry Greenberg, Baltimore, Md., assignor to U. S. Industrial Chemicals, Inc., New York, N. Y., a corporation of Delaware No Drawing. Application December 10, 1948, Serial No. 64,713

8 Claims. (Cl. 167—65)

This invention relates to a pharmaceutical methionine composition. The low solubility of methionine in water (3.4 gms. per 100 ml. of water) makes it difficult to administer orally or to inject directly into the blood stream colossal doses of that material, due to the large volume of water required to dissolve the methionine.

Furthermore, the solubility of methionine in water is not increased significantly through the use of buffers over the range of pH from about 2 to about 8, and the substitution for methionine of the soluble alkali metal or alkaline earth metal salts of methionine in aqueous solutions is not satisfactory by reason of the high pH of such solutions. In addition, the excessive alkalinity of the aqueous solutions of such salts cannot be reduced by the usual neutralization with acids, since in so doing methionine is precipitated.

The foregoing being in brief the state of the art, it is therefore an object of this invention to provide a composition having an increased potential or available methionine content when in aqueous solution.

It is also an object of this invention to provide an aqueous composition having an increased content of available methionine which has a pH value more closely approximating that of human blood.

The aforementioned objects are accomplished in accordance with the present invention by providing a composition comprising substantially equivalent amounts of methionine and a sodium, calcium or magnesium salt of methionine.

In order to prepare calcium methioninate, calcium hydroxide in the form of a fine powder (8.0 gms.) and methionine (30.0 gms.) were suspended in 100 ml. of absolute ethyl alcohol. Water (30 ml.) was added and the mixture was warmed. Solution took place rapidly, leaving a slight suspension of calcium hydroxide which was removed by filtration. On cooling the solution, crystallization took place. The fine crystals were filtered, washed with ethyl acetate, then ether, and were air dried. Calcium methioninate obtained, 32 gms. (95% yield), melting point 130° C. Calcium methioninate is a very stable compound, inasmuch as an aqueous solution of it loses only 1.45% of amino nitrogen when refluxed for 48 hours.

In preparing magnesium methioninate, methionine (15 gms.) was suspended in about 75 ml. of water to which 3 gms. of magnesium oxide had been added. On boiling the mixture for a short time, most of the oxide was dissolved. The solution was cooled, filtered and diluted with 200 ml. of absolute ethyl alcohol. After several hours, the separated magnesium methioninate was filtered off, washed with fresh ethyl alcohol, and was air dried. The desired product was obtained in about a 50% yield, and the remainder of the product could be recovered from the mother liquor.

In a similar manner the sodium salt of methionine was prepared.

The following table shows the changes in pH and methionine content when to saturated solutions of methionine are added equivalent amounts of the calcium, magnesium or sodium salt of methionine. A saturated aqueous solution of methionine alone has a pH of 5.6.

| Gms. Substance per 100 ml. H$_2$O | pH | Gms. Available Methionine per 100 ml. |
|---|---|---|
| 3.72 Ca Methioninate | 11.15 | 3.3 |
| 3.72 Ca Methioninate+3.3 gms. Methionine | 9.02 | 6.6 |
| 3.58 Mg Methioninate | 9.50 | 3.3 |
| 3.58 Mg Methioninate+3.3 gms. Methionine | 8.75 | 6.6 |
| 3.80 Na Methioninate | 11.02 | 3.3 |
| 3.80 Na Methioninate+3.3 gms. Methionine | 9.20 | 6.6 |

From an inspection of the foregoing table it will be noted that the three compositions containing both methionine and the methioninate salts had an available methionine content nearly twice that of a saturated aqueous solution of methionine. Furthermore, the pH value of the solution containing both methionine and the methioninate salt has been greatly reduced over that of the methioninate salt alone.

The compositions prepared as described supply the need for pharmaceutical solutions of increased content of available methionine and of satisfactory pH value, so that they may advantageously be employed for the injection of large amounts of methionine into the blood stream of human beings.

The term "methionine" as used in the present specification is intended to cover the material d, l-methionine.

I claim:

1. A composition of matter which consists essentially of substantially equivalent amounts of methionine and a material selected from the group consisting of sodium methioninate, calcium methioninate and magnesium methioninate, said composition being adapted to be dissolved in water to form a solution having an available methionine content greater than that of a saturated aqueous solution of methionine.

2. A composition as in claim 1, in which said material is sodium methioninate.

3. A composition as in claim 1, in which said material is calcium methioninate.

4. A composition as in claim 1, in which said material is magnesium methioninate.

5. An aqueous solution having dissolved therein a mixture which consists essentially of substantially equivalent amounts of methionine and a material selected from the group consisting of sodium methioninate, calcium methioninate and magnesium methioninate, said solution having an available methionine content greater than that of a saturated aqueous solution of methionine.

6. A composition as in claim 5, in which said material is sodium methioninate.

7. A composition as in claim 5, in which said material is calcium methioninate.

8. A composition as in claim 5, in which said material is magnesium methioninate.

HARRY GREENBERG.

REFERENCES CITED

The following references are of record in the file of this patent:

UNITED STATES PATENTS

| Number | Name | Date |
|---|---|---|
| 2,432,429 | Lecky | Dec. 9, 1947 |
| 2,432,478 | Lecky | Dec. 9, 1947 |

OTHER REFERENCES

Wyss, The Merck Report, pp. 16–18, April 1945.